Nov. 13, 1923.

L. BRADLEY 1,473,806

APPARATUS FOR SEPARATING TAR FROM GASES

Filed Dec. 5, 1918  2 Sheets-Sheet 1

Patented Nov. 13, 1923.

1,473,806

UNITED STATES PATENT OFFICE.

LINN BRADLEY, OF EAST ORANGE, NEW JERSEY, ASSIGNOR TO RESEARCH CORPORATION, OF NEW YORK, N. Y., A CORPORATION OF NEW YORK.

APPARATUS FOR SEPARATING TAR FROM GASES.

Application filed December 5, 1918. Serial No. 265,420.

*To all whom it may concern:*

Be it known that I, LINN BRADLEY, a citizen of the United States, residing at East Orange, in the county of Essex and State of New Jersey, have invented certain new and useful Improvements in Apparatus for Separating Tar from Gases, of which the following is a specification.

The present invention relates to the purification of gases and more particularly to the separation of tar from gases in which it is held in suspension.

In cleaning producer gas, gas from coke ovens, wood stills and other gases carrying tarry matter in suspension, it is becoming of increasing importance to remove those tars or tar constituents which condense at comparatively low temperatures. In commercial practice it has been found that along with these very light oils and tars are associated considerable quantities of tars or tarry constituents of high boiling points which remain in the gas either because of inefficiency of primary scrubbers or because of its vapor pressure. These heavy tars, when precipitated by an electrical precipitator, are found to be quite viscous and do not flow from the collecting electrodes readily at the temperatures at which the gases must be treated in order to effectively remove the lower boiling tarry constituents. For instance, a producer gas plant may operate with primary scrubbers and coolers which remove most of the heavy tar at temperatures of from 150° to 300° F. The gas can then be cooled to a temperature of 80° to 120° F. (90° being a good average figure), after which it may be passed through an electrical precipitator for final cleaning. Most of this tar can be removed electrically at this temperature, some slight amount of light oils and naphthaline and probably considerable quantities of the toluol and benzol remaining in the gas as vapor. When precipitated, it has been found that there was enough of the higher boiling tars present to make a viscous mass which would not run readily from the electrodes and thereby impede the operation of the precipitator.

It is the object of the present invention to provide a method of and means for removing the lower boiling tar constituents from gas in a commercially feasible manner.

It is a more specific object to provide a method of and apparatus for effectively and conveniently removing the lower boiling tar constituents by electric precipitation.

The invention consists briefly in subjecting gas containing low boiling tar constituents to an electric field at a relatively low temperature and heating the collecting electrodes externally of the field to a temperature such that the tar precipitated on the collecting surface is maintained in a flowing condition without materially affecting the temperature of the gas treated.

For a clearer understanding of the invention reference is had to the accompanying drawings, in which—

Figure 1:
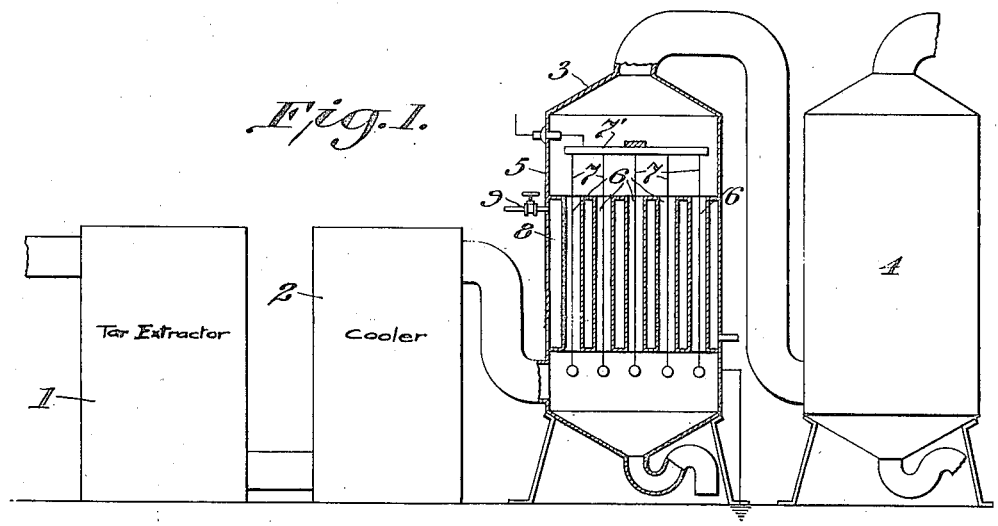
Fig. 1 is a diagrammatic representation of one arrangement for carrying out the objects of the invention.

Having reference to Fig. 1, the gas to be cleaned enters a washer or scrubber 1 which may be of any well known type such as for instance the Pelouze and Andouin extractor or the Drory tar-scrubber. The greater part of the higher boiling tar is thereby removed, but the lower boiling constituents and small quantities of higher boiling fractions pass on with the gas.

From the scrubber 1 the gas is conducted to a cooler 2 where its temperature is lowered to about 80°–120° F., then passes to an electric precipitator 3 charged with high tension alternating current and finally passes to an electric precipitator 4 of the D. C. type from which the gas is discharged in clean condition. The precipitators 3 and 4 differ from each other merely in that alternating current and direct current respectively are used for charging the gas stream. Since they are otherwise substantially similar, the description of one applies equally to the other. In the casing 5 are supported treater tubes 6 constituting the collecting electrodes and wires 7 suspended from a supporting frame 7' insulated as usually from the casing 5 constituting the discharge electrodes. The space intermediate the tubes 6 and the casing 5 is closed up at the top and bottom to form a steam jacket 8 to which steam is admitted by a pipe 9.

Figure 2:
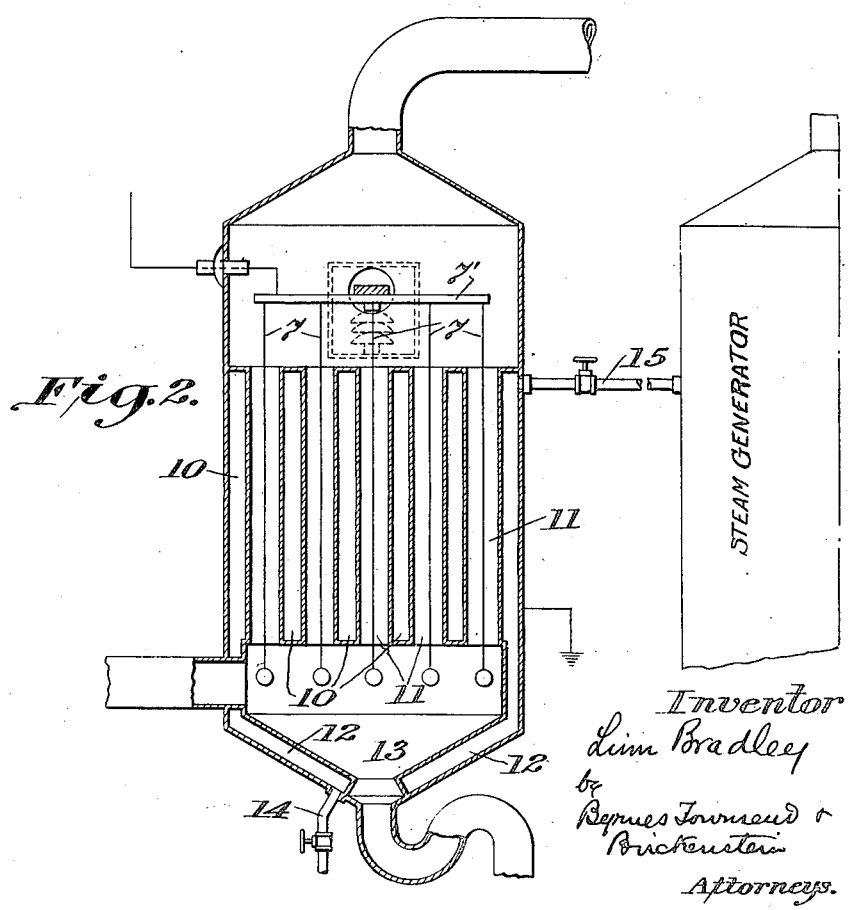
Fig. 2 is a sectional view of a slightly modified form of electric precipitator.

In the form shown in Fig. 2, the jacket 10 is extended downwardly beyond the tubes 11 to form a relatively shallow heating chamber 12 within the hopper 13 and coextensive with the walls thereof. Near the lower end of this heating chamber 10 is provided an outlet 14 for the condensed steam, the steam being admitted through an inlet pipe 15.

Instead of a steam jacket, heating coils through which steam or hot water is circulated might of course be used to supply the desired heating effect. In fact heat propagating media other than steam or hot water might be used for the purposes of the invention. The particular means disclosed has been merely referred to because I have found it simple, cheap and effective and easily to regulate.

The operation is as follows:

As has been previously stated the gas is first subjected to a cleaning process in a scrubber, then cooled to about 80°–120° F., and in this condition passed through the precipitator 3 where it is subjected to the action of the electric field of alternating current. The minute particles of tar are agglomerated and some tar is incidentally precipitated. Due to the presence of higher boiling tarry constituents a viscous deposit is formed on the walls of the collecting electrodes 6 which deposit, at the relatively low temperature of the gas under treatment, adheres firmly to the walls. The admission of the steam may be so regulated that the temperature to which the walls of the collecting electrodes 6 are heated is kept uniformly at a point which is slightly in excess of the temperature of the gas. This excess may for instance be about 20°, more or less within reasonable limits, so that instead of heat being absorbed by the metal of the electrodes from the tar deposited, heat is transferred to the layer of tar in sufficient quantity to keep the tar in a condition of fluidity without, however, transmitting sufficient heat to the interior of the tubes to appreciably heat the gas passing therethrough.

The extent to which the collecting electrodes may be heated in excess of the temperature of the gas is a matter of compromise between two extremes and of sound judgment.

From the precipitator 3 the gas enters into the precipitator 4 and carries with it those agglomerated tar particles which have not been incidentally separated out in the precipitator 3. By the action of the direct current the agglomerated particles including the lower boiling constituents and such higher boiling constituents as have been carried over from the scrubbers or washers are precipitated and deposited as a viscous mass on the walls of the collecting electrodes. By the action of the heat applied to the collecting electrodes the tarry deposit is kept in a condition of fluidity as previously described.

Figure 3:
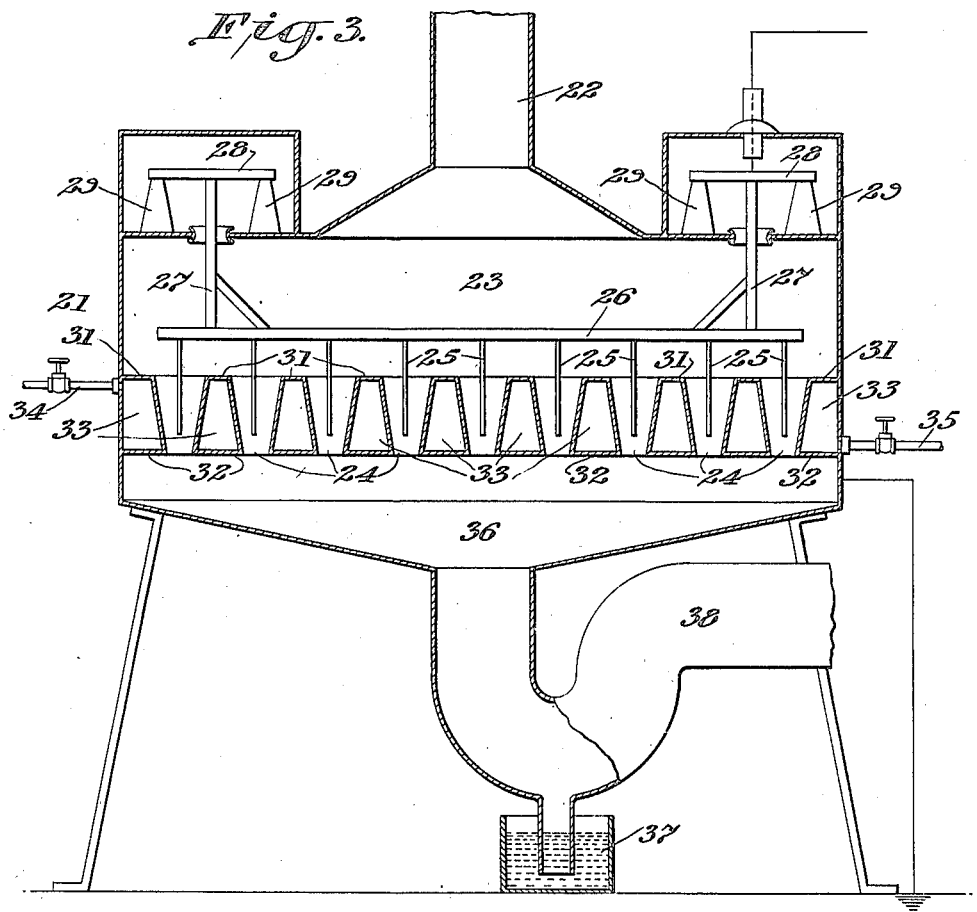
Fig. 3 is a sectional view of what I consider at present as the preferred embodiment of the invention.

The device shown in Fig. 3 is primarily designed to separate tar from gas in a single operation. While primary scrubbers or washers may be resorted to, the apparatus shown is capable of completely separating out the tarry particles suspended in gases. The gas is first cooled in a suitable cooling device to a temperature equal to or even below that at which the lighter tarry constituents condense, preferably 80°–120° as before stated, and then passed through the admission flue 22 into the precipitator chamber 23 of the precipitator 21. The precipitator chamber 21 contains a relatively large number of treater units comprising short treater tubes 24 and discharge electrodes 25 suspended from a supporting frame 26. The frame 26 is in turn supported by rods 27 and cross-beams 28 on insulators 29 above the treater chamber 23 and out of contact with the tarry gases so as to reduce the danger of a break down.

The treater tubes 24 are preferably tapered to gradually vary the dielectric distance between the electrodes in proportion to the gradual change of dielectric which is brought about by the precipitation of the tarry particles out of the gas stream.

Figure 4:
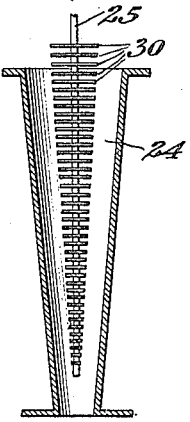
Fig. 4 is a fragmentary view of a detail.

The discharge electrodes 25 are relatively rigid and so supported as to assume and maintain a definite position centrally of the treater tubes 24 and may be provided with prongs or disks 30 (see Fig. 4) so graded in diameter as to exactly adjust the gradient of the inter-electrode distance.

The space surrounding the tubes 24 is closed at the top and bottom by transverse walls 31 and 32 respectively to form a heating jacket 33. By means of an inlet 34 and an outlet 35 a suitable heating medium may be circulated through the jacket 33. Such a medium may consist of cleaned gas heated to the required temperature, steam, steam and air, or hot water.

The tube or pipes 24 are made short so that the gas in its passage therethrough is not materially affected by the heat applied to the tubes.

The discharge electrodes do not extend entirely through the tubes 24, but terminate a short distance above the lower end thereof so that the danger of short circuit through the tar is avoided. In most instances it has been found that such tar as deposits on the discharge electrodes is in such a state of fluidity that it readily drips from the electrode. When the discharge electrode is of small cross section or low electric conductivity, it will be heated by the electric discharge and this will result in a fluid condition of any tar that may deposit upon it.

The tar collected in the treater tubes flows down into the hopper 36 whence it is drained through a tar and water seal 37, while the clean gas passes out through the outlet 38.

I have found that treater tubes or pipes of 1 to 3 feet length, of 2″ to 6″ width at the wide end and of 1″ to 3″ width at the narrow end give good satisfaction. It is understood, however, that the dimensions may be changed within considerable limits within the scope of the disclosure.

I claim:—

1. Apparatus for removing tar from gas, comprising a treater chamber, a plurality of treater tubes and means for externally heating the tubes sufficiently to cause tar precipitated thereon to flow, the tubes being sufficiently short to prevent a substantial heating of the gas in its passage therethrough and the diameter of the tubes increasing from bottom to top in proportion to the variation in the dielectric strength of the gas during its passage through the tubes.

2. Apparatus according to claim 1 in which the discharge electrodes are rigid and terminate above the lower end of the tubes.

In testimony whereof, I affix my signature.

LINN BRADLEY.